Mar. 20, 1923.
J. S. KERN
TIRE CARRIER
Filed Sept. 29, 1921
1,449,329
2 sheets-sheet 1
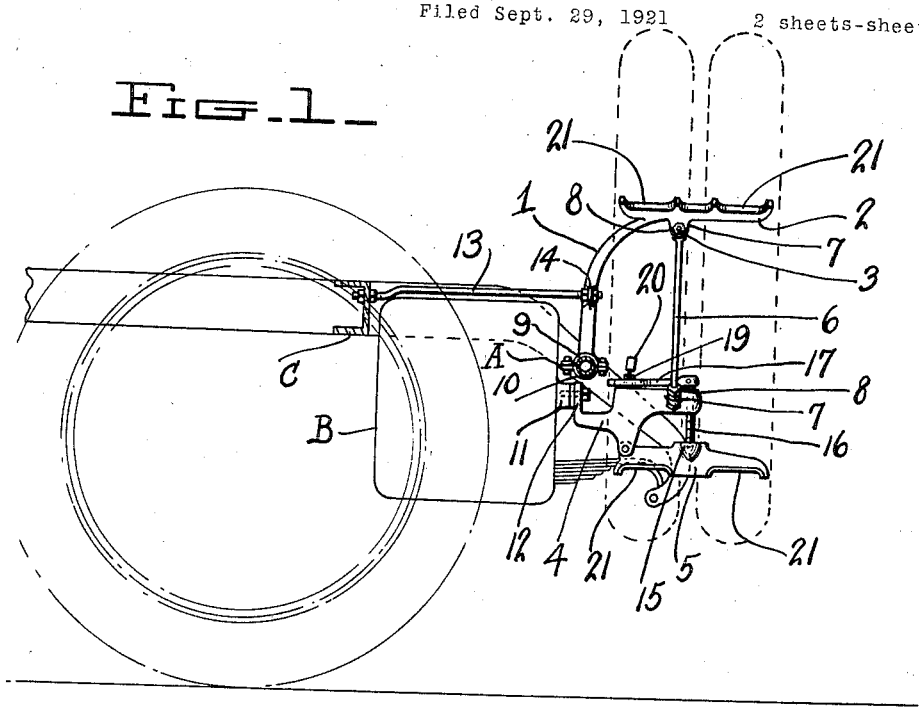
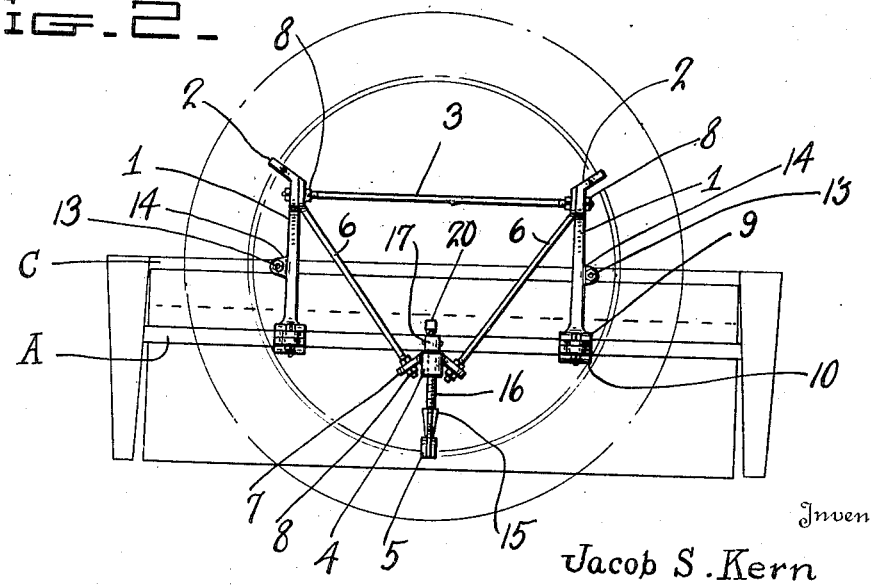
Inventor
Jacob S. Kern
By
Attorney Mar. 20, 1923.
J. S. KERN
1,449,329
TIRE CARRIER
Filed Sept. 29, 1921  2 sheets-sheet 2
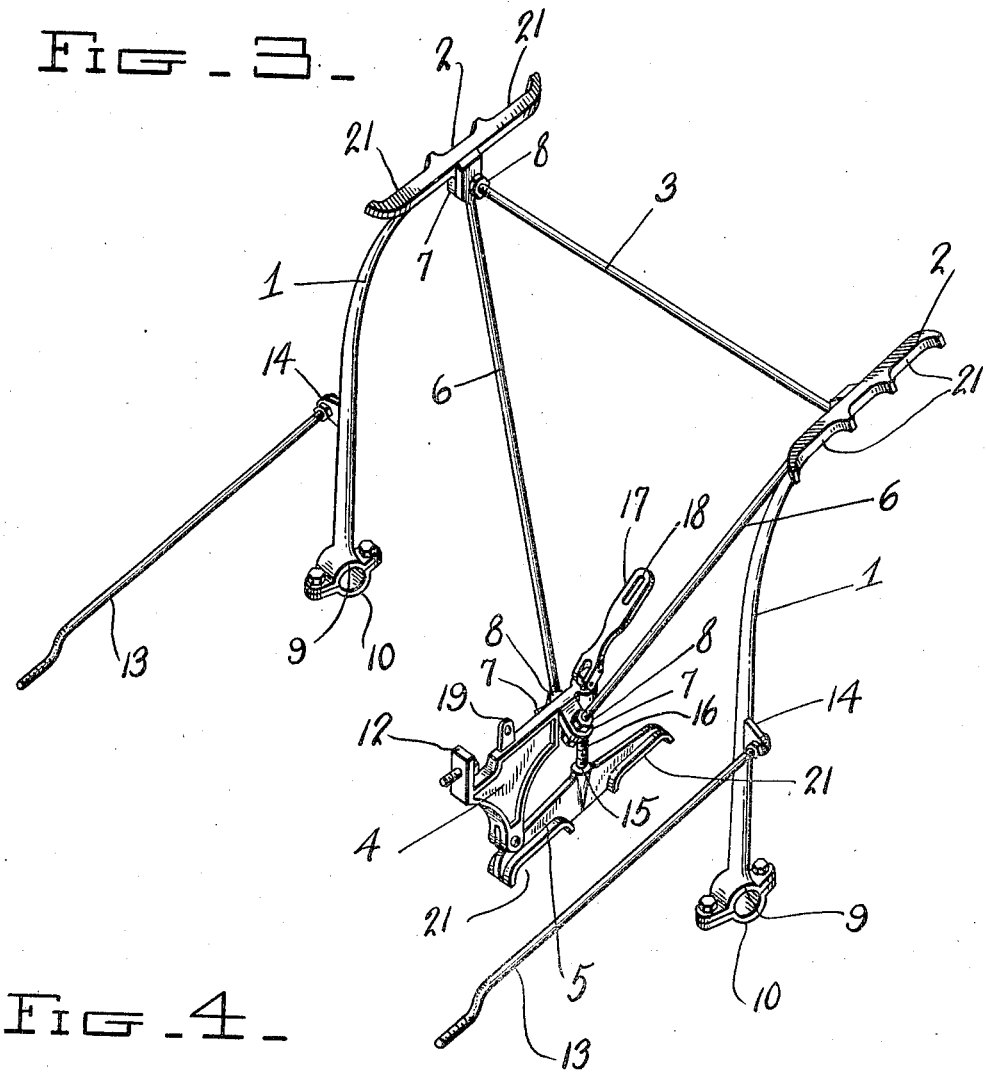
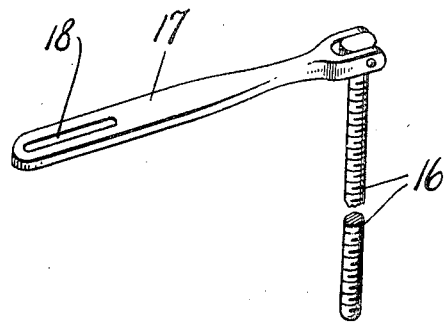
Inventor
Jacob S. Kern Patented Mar. 20, 1923.

1,449,329

UNITED STATES PATENT OFFICE.

JACOB S. KERN, OF FLEETWOOD, PENNSYLVANIA.

TIRE CARRIER.

Application filed September 29, 1921. Serial No. 504,073.

*To all whom it may concern:*

Be it known that I, JACOB S. KERN, a citizen of the United States, residing at Fleetwood, in the county of Berks and State of Pennsylvania, have invented certain new and useful Improvements in Tire Carriers, of which the following is a specification.

This invention relates to improvements in tire carriers, the general object of the invention being to provide a carrying frame at the rear of the automobile for supporting a pair of spare tires and their rims.

Another object of the invention is to provide means whereby the tires can be quickly and easily clamped in the frame or removed therefrom, with means for locking the clamping part against movement so as to prevent theft of the tires.

A further object of the invention is to provide a pair of rim engaging members at the top of the frame and a movable rim engaging member at the bottom of the frame, with a screw member for adjusting said movable member to clamp and unclamp the rims.

Another object of the invention is to provide a handle for the screw member which is pivoted thereto and which is adapted to be engaged by the locking means.

With these objects in view, the invention consists in the details of construction and combination of elements hereinafter set forth and then specifically designated by the claim.

In order that those skilled in the art to which this invention appertains, may understand how to make and use the same, I will describe its construction in detail, referring by numerals to the accompanying drawings forming a part of this application, in which:—

Figure 1 is a side elevation of the invention, showing the same in use.

Figure 2 is a rear elevation of the carrier.

Figure 3 is a perspective view of the carrier.

Figure 4 is a perspective view of the screw member and its handle.

The carrier frame consists of two arms 1 which are slightly curved at their upper end portions. Tire supporting members 2 are connected with the upper ends of the arms. A cross rod 3 bridges the space between the arms and is connected with the arms. A bracket 4 is located between the arms and is disposed below the cross rod 3. A tire supporting or engaging member 5 is carried by the bracket. Rods 6 connect the bracket with the upper portions of the arms 1. The bracket 4 is provided with lugs 7 through which the rods 6 pass and the said rods are adjustably connected with the said lugs by means of nuts 8 screw threaded upon the rods.

The lower ends of the arms 1 are formed with semi-circular clamping jaws 9 and similar jaws 10 are bolted to these jaws 9. These jaws are adapted to engage the tubular cross bar A at the rear of the automobile and which extends across the outer face of the gasolene tank B. A lug 11 on the tank is engaged by a vertical part 12 of bracket 4, and this part is bolted to the lug.

A rod 13 is connected to an ear 14, on each arm 1, by nuts engaging a screw threaded part of the rod, and the other ends of these rods are connected with the rear cross piece C of the chassis frame by other nuts engaging the screw threaded ends of the rods. Thus the carrier is connected with the automobile at five points.

The lower supporting member 5 is provided with a socket 15 which is engaged by the end of a screw bolt 16, which passes through a screw-threaded hole in the outer end of the bracket 4. A handle 17 has its forked end pivoted to the head of the bolt and the other end of this handle is provided with a slot 18 for receiving the staple 19, carried by the bracket, and which is adapted to receive the hasp of a padlock 20.

The outer edge of each supporting member is formed with a pair of recesses 21 to receive the tire rims, so that the device will support a pair of extra tires.

In placing the tires on the device, the screw-bolt is first rotated to lift the lower member into inoperative position. Then the rims, with the tires thereon, are placed in the recesses of the upper members and then the lower member is moved downwardly by the screw-bolt, until its recesses engage the rims. The bolt is turned until the member 5 presses firmly against the rims and then the handle is swung over to place its slot over the staple. The lock is then put in place to hold the parts in the positions they occupy in Figure 1. The rims are engaged at three points and as the rims are seated in recesses at these points, they cannot be removed from the device without moving the lower member away from the rims. The handle 17, being pivoted to the screw-bolt by its forked end, can be used to give the bolt a partial turn, and when the handle approaches the bar 6, it can be swung over in a vertical position to clear the bar and complete the turn. Thus the screw-bolt can be screwed home with a series of partial turns of the handle.

Having thus described my invention what I claim is:—

A tire carrier comprising a pair of arms having curved upper end portions and tire engaging elements carried at their upper ends, means for securing the arms to a support, a cross rod connected with the arms at their upper ends and bridging the space between them, a bracket located between the arms and disposed below the cross rod, angularly disposed rods connected with the bracket and the arms and the cross rod, the cross rod and the angularly disposed rods being arranged in the form of a triangle having an open center, a screw member carried by the brackets, means for locking the screw member against turning movement and located opposite the open center of the triangle described by the said rods, and a tire engaging member pivotally connected with the screw member.

In testimony whereof I affix my signature.

JACOB S. KERN.